United States Patent
Ali et al.

(10) Patent No.: US 7,664,918 B2
(45) Date of Patent: Feb. 16, 2010

(54) HANDLING FETCH REQUESTS THAT RETURN OUT-OF-ORDER AT AN INSTRUCTION FETCH UNIT

(75) Inventors: Abid Ali, San Jose, CA (US); Andrew T. Ewoldt, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 596 days.

(21) Appl. No.: 11/492,257

(22) Filed: Jul. 24, 2006

(65) Prior Publication Data

US 2008/0022045 A1 Jan. 24, 2008

(51) Int. Cl.
*G06F 12/00* (2006.01)
(52) U.S. Cl. ...................... 711/125; 711/118
(58) Field of Classification Search ............... None
See application file for complete search history.

(56) References Cited

U.S. PATENT DOCUMENTS

| | | | | |
|---|---|---|---|---|
| 5,761,713 A | * | 6/1998 | Lesartre | 711/127 |
| 6,594,755 B1 | * | 7/2003 | Nuechterlein et al. | 712/239 |
| 6,895,475 B2 | * | 5/2005 | Volpe et al. | 711/137 |
| 6,938,146 B2 | * | 8/2005 | Shafi et al. | 711/213 |

* cited by examiner

*Primary Examiner*—Reginald G Bragdon
*Assistant Examiner*—Thanh D Vo
(74) *Attorney, Agent, or Firm*—Park, Vaughan & Fleming LLP (57) ABSTRACT

One embodiment of the present invention provides a system that handles instruction fetch requests that return out-of-order at an IFU of a processor. During operation, the system sends a request to obtain a cache line to an instruction cache, wherein the request can be serviced and the cache line can be sent to a fetch buffer before a preceding cache line for a preceding request has returned from the instruction cache. In response to the request, the system receives the cache line from the instruction cache. Next, the system determines whether the cache line was returned out-of-order with respect to the preceding cache line. If so, the system performs an action to handle the out-of-order return.

21 Claims, 9 Drawing Sheets

HANDLING FETCH REQUESTS THAT RETURN OUT-OF-ORDER AT AN INSTRUCTION FETCH UNIT

BACKGROUND

1. Field of the Invention

The present invention generally relates to the design of processors within computer systems. More specifically, the present invention relates to a method and an apparatus for handling fetch requests that return out-of-order at an instruction fetch unit in a processor.

2. Related Art

Advances in semiconductor fabrication technology have given rise to dramatic increases in processor clock speeds. These increasing clock speeds have significantly increased processor performance. However, as clocks speeds continue to increase, it is becoming progressively harder to fetch instructions quickly enough to keep pace with increasing instruction-execution rates. To deal with this problem, some processors are beginning to support multiple outstanding fetch requests to fetch instruction cache lines. This enables multiple fetch requests to be processed in parallel, which can greatly increase the rate at which instructions are fetched. However, the multiple outstanding fetch requests can potentially return out-of-order. Providing mechanisms to handle such out-of-order returns can greatly complicate the design of the instruction fetch unit (IFU). Furthermore, if such mechanisms are not designed properly, the actual number of outstanding fetch requests will be reduced in some situations, which can adversely affect processor performance.

Hence, what is needed is method and an apparatus that efficiently handles fetch requests that return out-of-order without the above-described problems.

SUMMARY

One embodiment of the present invention provides a system that handles instruction fetch requests that return out-of-order at an IFU of a processor. During operation, the system sends a request to obtain a cache line to an instruction cache, wherein the request can be serviced and the cache line can be sent to a fetch buffer before a preceding cache line for a preceding request has returned from the instruction cache. In response to the request, the system receives the cache line from the instruction cache. Next, the system determines whether the cache line was returned out-of-order with respect to the preceding cache line. If so, the system performs an action to handle the out-of-order return.

In a variation on this embodiment, performing the action involves: ignoring the cache line which was received out-of-order; and restoring a fetch credit for a strand that sent the request, so that the strand can initiate another request. (The term "strand" as used in this specification and the associated claims refers to any thread of execution that maintains its own program counter. Note that strands are also referred to as "processes" or threads.")

In a further variation, performing the action additionally involves undoing operations performed when the cache line was received out-of-order.

In a further variation, performing the action additionally involves retrying the request for the cache line that was received out-of-order.

In a variation on this embodiment, the IFU includes a separate fetch buffer for each strand.

In a further variation, a fetch buffer for a given strand contains a first entry and a second entry, whereby the first entry to can be written to while the second entry is read from, and vice versa.

In a further variation, each fetch buffer entry is associated with: a miss flag, which indicates whether a request for the entry has caused a cache miss; and a hit flag, which indicates whether a request for the entry has caused a cache hit.

In a further variation, each fetch buffer is associated with: a write pointer, which points to an entry in the fetch buffer which is currently being written to; and a read pointer, which points to an entry in the fetch buffer which is currently being read from.

In a further variation, if the request to obtain the cache line causes an L1 cache miss, the system sends the request to an L2 cache and also stores a miss queue identifier (MQID) for the request into a fetch buffer entry. Next, when a cache line is subsequently returned by the L2 cache, the system determines whether the cache line is being returned out-of-order by comparing an MQID returned along with the cache line against an MQID stored in the fetch buffer entry.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Processor

Figure 1:
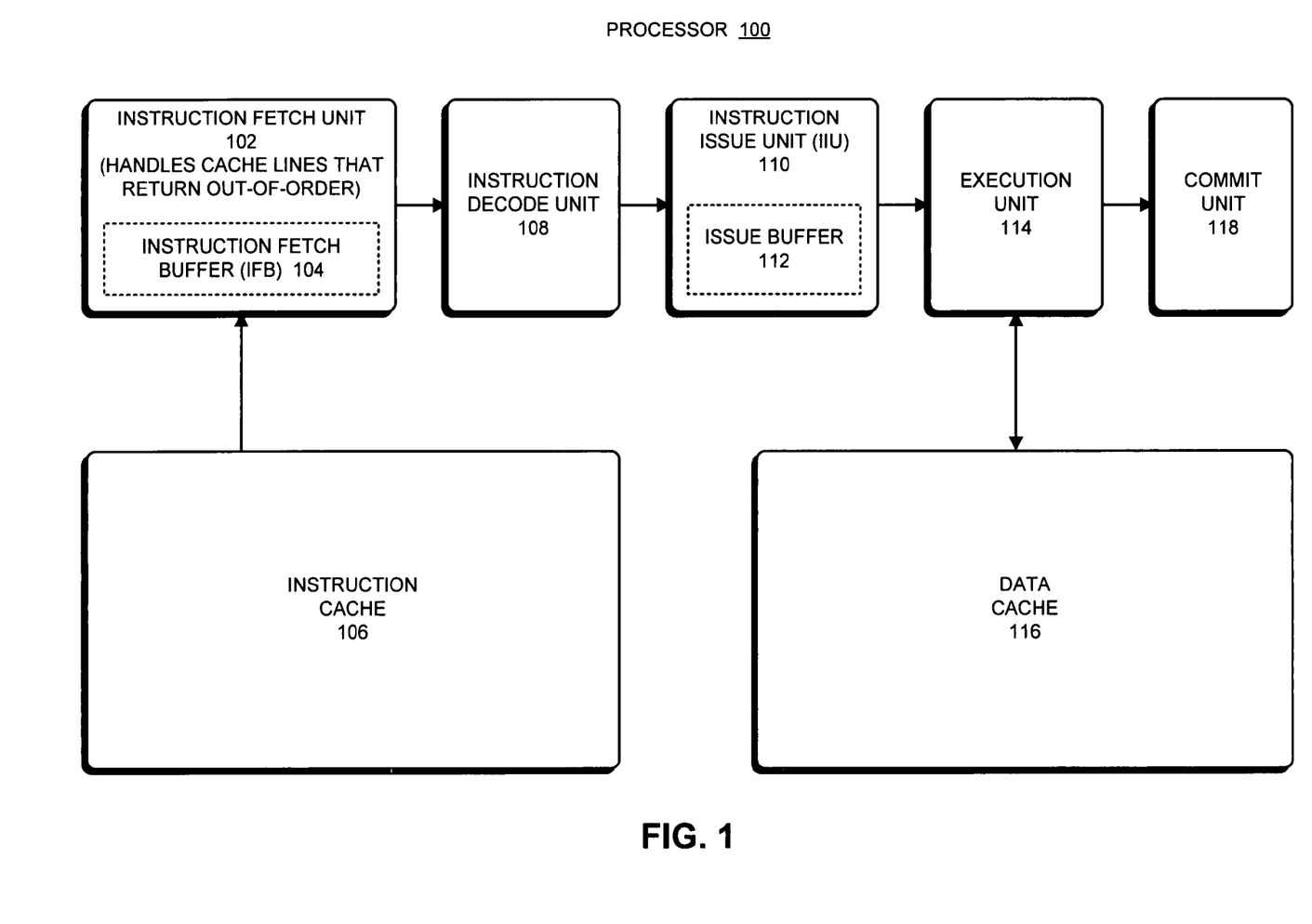
FIG. 1 illustrates a processor in accordance with an embodiment of the present invention.

FIG. 1 presents a block diagram of a processor 100 in accordance with an embodiment of the present invention. Processor 100 can generally include any type of processor, including, but not limited to, a microprocessor, a mainframe computer, a digital signal processor, a device controller and a computational engine within an appliance.

Referring to FIG. 1, processor 100 includes instruction-fetch unit (IFU) 102, which fetches cache lines containing instructions from instruction cache (I-cache) 106. In one embodiment of the present invention, each cache line is 64 bytes in size and each instruction takes up to 4 bytes, so 16 instructions exist in each cache line.

IFU 102 temporarily stores these cache lines in an instruction-fetch buffer (IFB) 104 which is maintained for each strand, and then forwards "bundles" of instructions downstream to instruction-decode unit 108. In one embodiment of the present invention, each bundle contains up to four instructions.

Instruction-decode unit 108 decodes and forwards the instructions to instruction-issue unit (IIU) 110, which stores the instructions in issue buffer 112. Next, IIU 110 sends the instructions to execution unit 114. During execution of the instructions, execution unit 114 can access data from data cache 116. When the instructions have finished executing, the results are sent to commit unit 118, which commits the results.

In one embodiment of the present invention, IFU 102 includes mechanisms which handle instruction cache lines that return out-of-order. These mechanisms are described in more detail below with reference to FIGS. 2-10.

Pipeline-Stage Diagram

Figure 2:
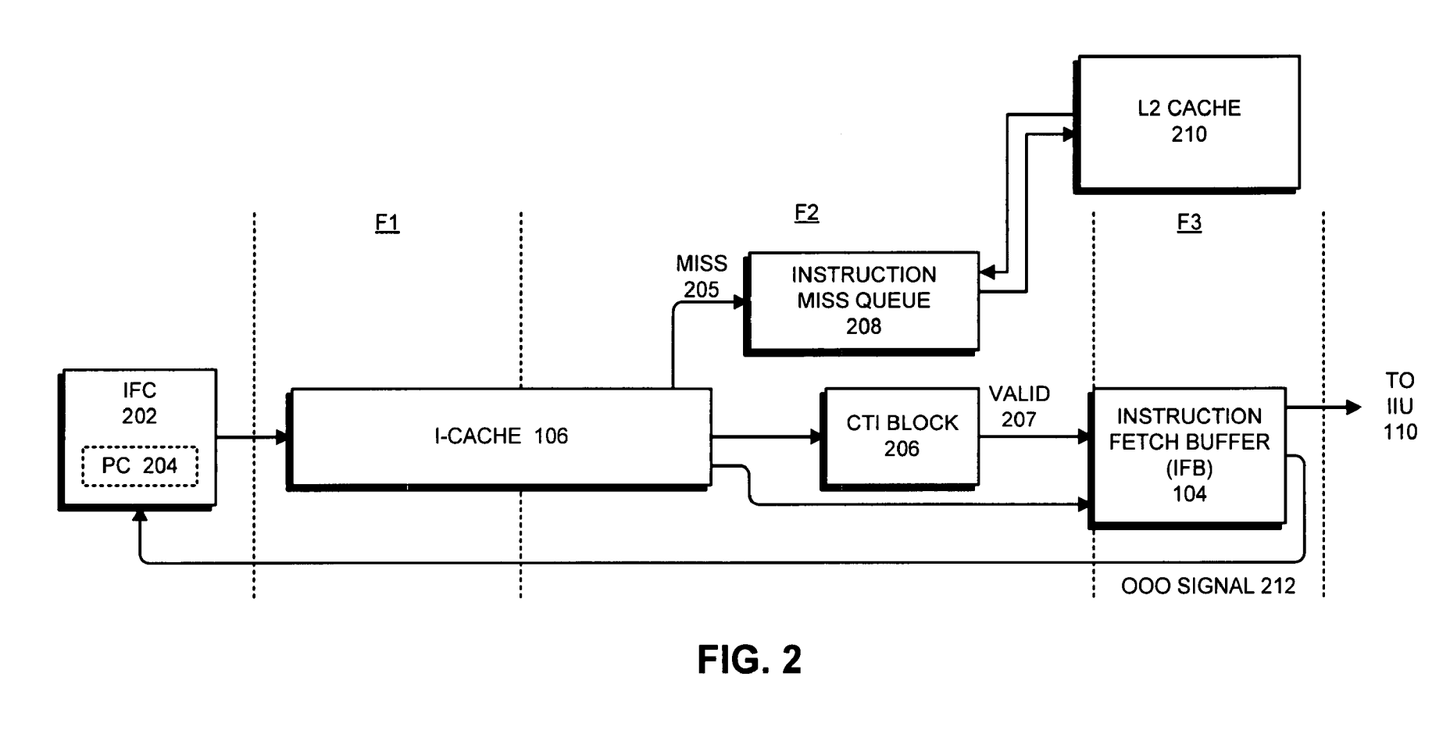
FIG. 2 presents a pipeline-stage diagram illustrating the instruction-fetch process in accordance with an embodiment of the present invention.

FIG. 2 presents a pipeline-stage diagram illustrating the instruction-fetch process in accordance with an embodiment of the present invention. More specifically, FIG. 2 illustrates various operations that take place during four pipeline states F1-F3, which are associated with the instruction-fetching process.

IFC circuitry 202 is responsible for starting the process of issuing a fetch request based on PC 204 (see FIG. 2). To accomplish this, instruction-fetch-control (IFC) circuitry 202 includes a number of state machines and maintains a program counter (PC) for each process. For example, in FIG. 2, IFC circuitry 202 maintains a PC 204.

In response to a fetch request initiated by IFC circuitry 202, a cache line is retrieved from I-cache 106 during stages F1 and F2 and is loaded into instruction-fetch buffer (IFB) 104 at the end of stage F2. IFB 104 is activated in stage F3.

CTI block 206 scans the cache line to locate control-transfer instructions (CTIs) within the cache line and produces valid signals 207, which indicate what instructions in the cache line are valid with respect to the CTIs. Note that CTI instructions are typically branches, and these branches determine whether instructions should be included in a fetch bundle. For example, an instruction following a taken-branch (and associated delay slot) should not be included in the same fetch bundle as the taken-branch, because the execution stream will jump to the branch target and the instruction following the taken-branch will not be executed (at least not right away).

Hence, IFB 104 uses valid signals 207 to form "fetch bundles" containing instructions that are sent through instruction-decode unit 108 to IIU 110.

In the case of a cache miss, I-cache 106 generates a miss signal 205, which causes instruction-miss queue 208 to send a corresponding fetch request to Level 2 (L2) cache 210. When this fetch request eventually returns a cache line, the cache line is stored into I-cache 106.

Note that IFB 104 also generates an out-of-order (OOO) signal 212 which indicates whether the cache line is received out-of-order. OOO signal 212 is communicated back to IFC circuitry 202, which allows IFC circuitry 202 to perform an action to deal with an out-of-order return. This process is described in more detail below with reference to FIGS. 3-10, but first we examine a number of fetch cases.

Fetch Cases

In one embodiment of the present invention, each strand can issue up to two outstanding fetch requests at any given time. Hence, each strand is given access to two "credits." Each time a fetch is sent to the instruction cache for a strand, the corresponding credit is decremented, and the corresponding credit is incremented when the corresponding fetch buffer line is completely sent over to IIU 110.

These fetch requests can potentially return out-of-order (OOO) depending on which requests hit in the instruction cache. In the event that both requests miss the instruction cache, the cache lines which return from the L2 cache could still return out-of-order.

Four cases can occur when fetch requests for two consecutive cache lines x and x+64 are sent to the instruction cache.
1. If both x and x+64 cause cache hits, the cache lines are received in-order;
2. If x causes a cache hit and x+64 causes a cache miss, the cache lines are received in-order, and the system subsequently fetches x+64 and x+128;
3. If x causes a cache miss and x+64 causes a cache hit, the cache lines are received out-of-order;
4. If both x and x+64 cause cache misses, the cache lines might possibly be received out-of-order from the L2 cache.

In one embodiment of the present invention, if the cache lines x and x+64 are received out-of-order (which means x+64 is received before x), the data return for x+64 does not get stored into IFB 104. Instead, the system waits and writes the data return for x into IFB 104 first, and retries the fetch for x+64.

IFB 104 is designed to handle these four cases as is described in more detail below.

Instruction Fetch Buffer

Figure 3:
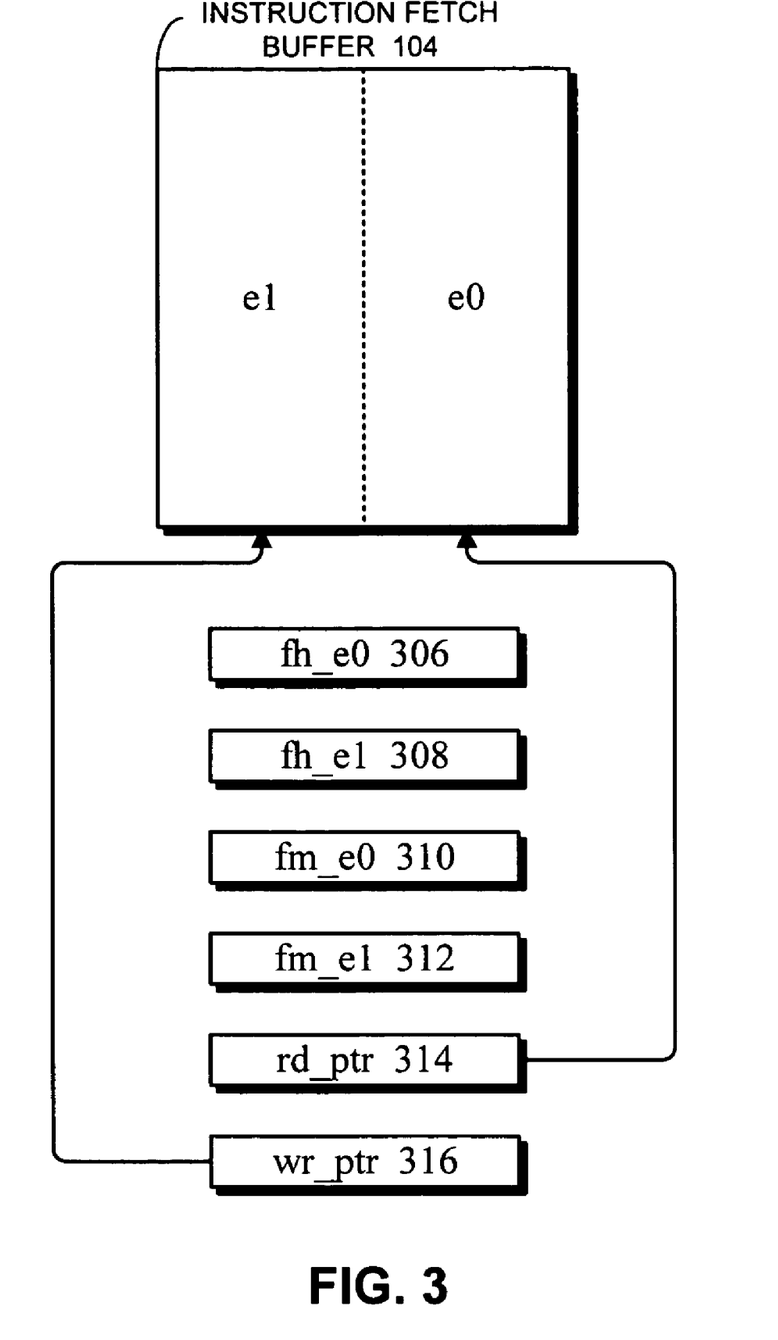
FIG. 3 illustrates an instruction fetch buffer along with associated state variables in accordance with an embodiment of the present invention.

FIG. 3 illustrates an IFB 104 buffer for a single strand along with associated state variables in accordance with an embodiment of the present invention. In this embodiment, IFB 104 includes two entries, e0 and e1. Separate hit and miss flags are maintained for each entry, e0 and e1, which indicate whether the entry is associated with a cache hit or a cache miss. More specifically, these hit and miss flags include: a fetch hit flag (fh_e0) 306 for entry e0; a fetch hit flag (fh_e1) 308 for entry e1; a fetch miss flag (fm_e0) 310 for entry e0; and a fetch miss flag (fm_e1) 312 for entry e1. In one embodiment of the present invention these hit and miss flags are implemented using a single bit.

Furthermore, IFB 104 is also associated with a read pointer (rd_ptr) 314 and a write pointer (wr_ptr) 316. Since there are only two entries, e0 and e1, in IFB 104, rd_ptr 314 and wr_ptr 316 can be implemented using a single bit, which has a value of 0 or 1, to point to either e0 or e1, respectively. In FIG. 3, rd_ptr 314 points to e0 and wr_ptr 316 points to e1. This enables entry e0 to be read from while entry e1 is being written to.

Between resets or pipe-clears, incoming instruction stream packets will sink into corresponding fetch buffer entries in a round-robin fashion. This means that fetch x can sink into either e0 or e1 depending on where wr_ptr 316 is pointing to.

If fetch x causes a cache miss, the system sets a corresponding fetch miss bit. When the system subsequently receives a data return for x+64, since the fetch miss bit for x is set, the system does not accept the data return for x+64 into the IFB 104. The reason behind not accepting the data return for x+64 at this stage is that there are certain branch attributes that might be embedded in the cache line for x+64, and these attributes can only be captured after the cache line for fetch x has been processed by IFU 102. Hence, the fetch for x+64 is replayed through the instruction fetch pipeline at least one more time after the in-order fetch for x is received.

The various operations that involve IFB 104 and the associated state variables are described in more detail below with reference to FIGS. 4-10.

Read Pointer

Figure 4:
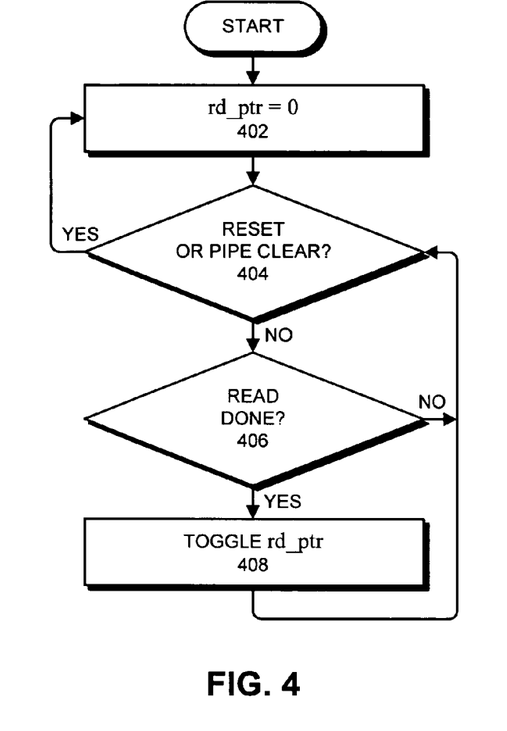
FIG. 4 presents a flow chart illustrating how a read pointer is updated in accordance with an embodiment of the present invention.

FIG. 4 presents a flow chart illustrating how rd_ptr 314 is updated in accordance with an embodiment of the present invention. First, rd_ptr 314 is set to zero (step 402). Next, the system determines whether a system reset or a pipe clear event has occurred (step 404). If so, the system returns to step 402 to set rd_ptr 314 to zero again. Otherwise, the system determines whether the current read operation for the current instruction cache line is done (step 406). If not, the system returns to step 404. On the other hand, if the read operation is done, the system toggles rd_ptr 314, so that rd_ptr 314 points to the other entry in IFB 104 (step 408). The system then returns to step 404.

Write Pointer

Figure 5:
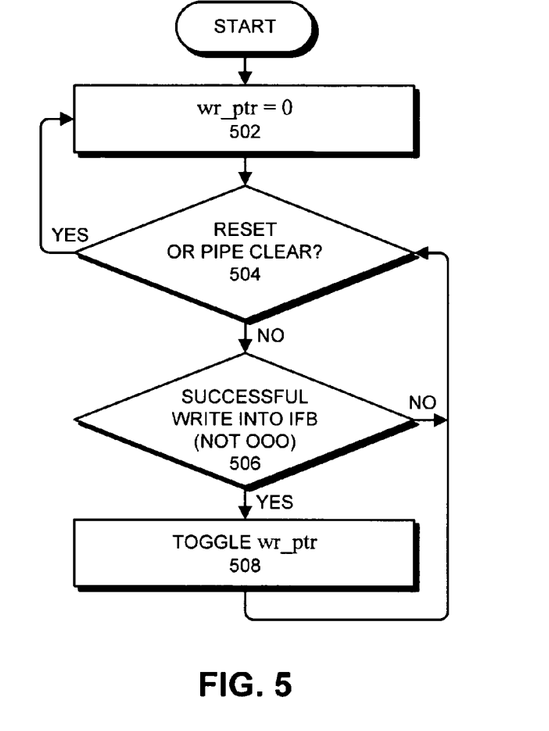
FIG. 5 presents a flow chart illustrating how a write pointer is updated in accordance with an embodiment of the present invention.

FIG. 5 presents a flow chart illustrating how a wr_ptr 316 is updated in accordance with an embodiment of the present invention. First, wr_ptr 316 is set to zero (step 502). Next, the system determines whether a system reset or a pipe clear event has occurred (step 504). If so, the system returns to step 502 to set wr_ptr 316 to zero again. Otherwise, the system determines whether the write operation into IFB 104 was successful (step 506). This can mean one of the following: the operation was not tagged as out-of-order; there was an instruction cache hit; or there was an instruction fill.

If the current write operation was not successful, the system returns to step 504. On the other hand, if the current write operation was successful, the system toggles wr_ptr 316, so that wr_ptr 316 points to the other entry in IFB 104 (step 508). The system then returns to step 504.

Fetch-Miss Bit

Figure 6:
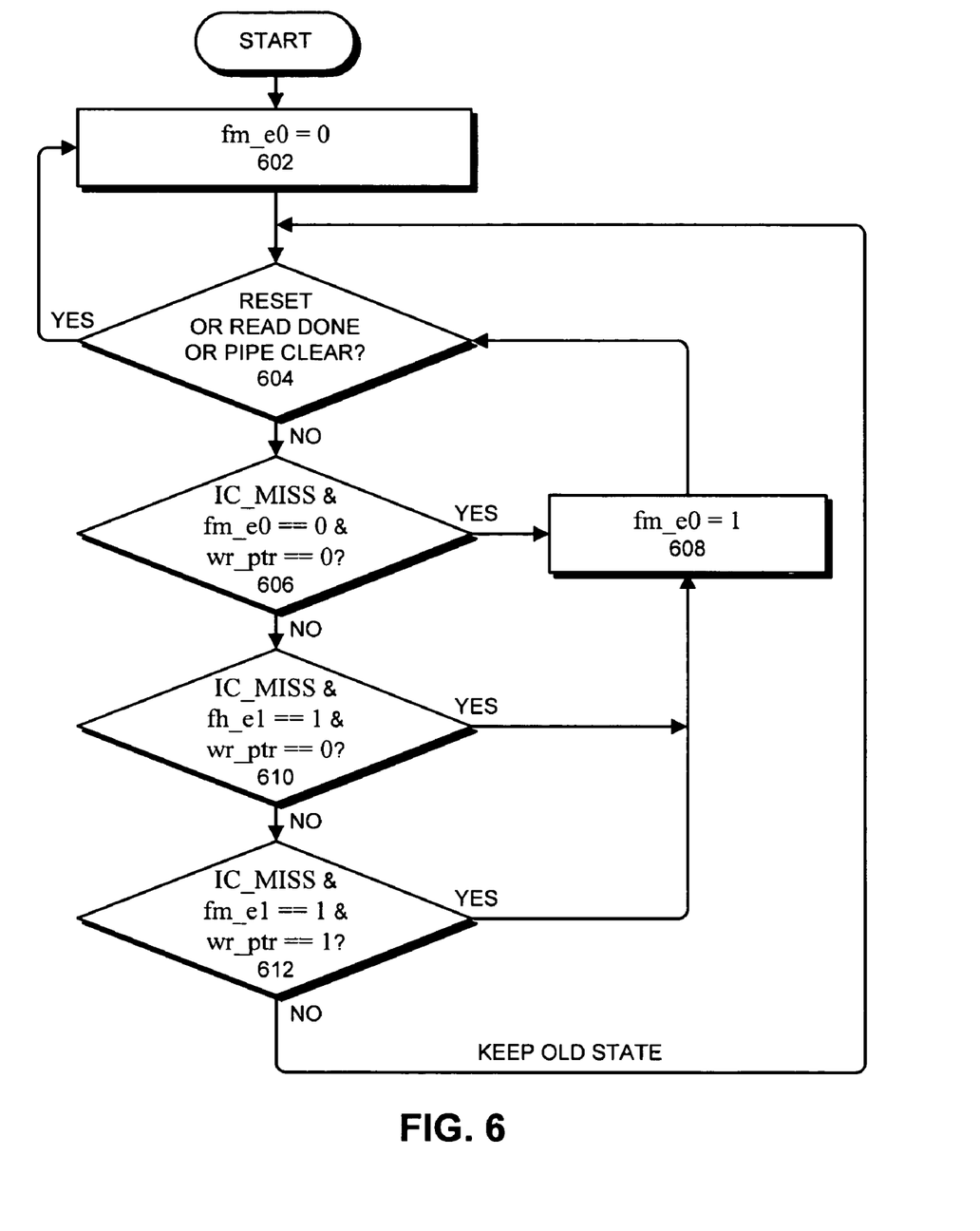
FIG. 6 presents a flow chart illustrating how a fetch-miss bit is updated in accordance with an embodiment of the present invention.

FIG. 6 presents a flow chart illustrating how a fetch-miss bit fm_e0 for entry e0 is updated in accordance with an embodiment of the present invention. (Note that the flow chart for the fetch miss bit fm_e1 associated with entry e1 is symmetric and is hence not described.)

First, the system sets fm_e0 to zero (step 602). Next, the system determines whether a reset, read-done or pipe-clear event has occurred (step 604).

If so, the system returns to step 602 to set fm_e0 to zero again. Otherwise, the system determines whether there was a cache miss & fm_e0==0 & wr_ptr==0 (step 606). This is the case where there is a miss in the current cache line "x."

If so, the system sets fm_e0 to 1 (step 608) and returns to step 604. Otherwise, the system determines whether there was a cache miss & fh_e1==1 & wr_ptr==0 (step 610). This is the case where there is a miss in x+64, there is a hit in x, and the system is presently active in e1.

If so, the system sets fm_e0 to 1 (step 608) and returns to step 604. Otherwise, the system determines whether there was a cache miss & fm_e1==1 & wr_ptr==1 (step 612). This is the case where there is a miss in x+64, there is a miss in x, and there is a current pending return for entry e1.

If so, the system sets fm_e0 to 1 (step 608) and returns to step 604. Otherwise, the system does not change fm_e0 and simply returns to step 604.

Fetch-Write Bit

Figure 7:
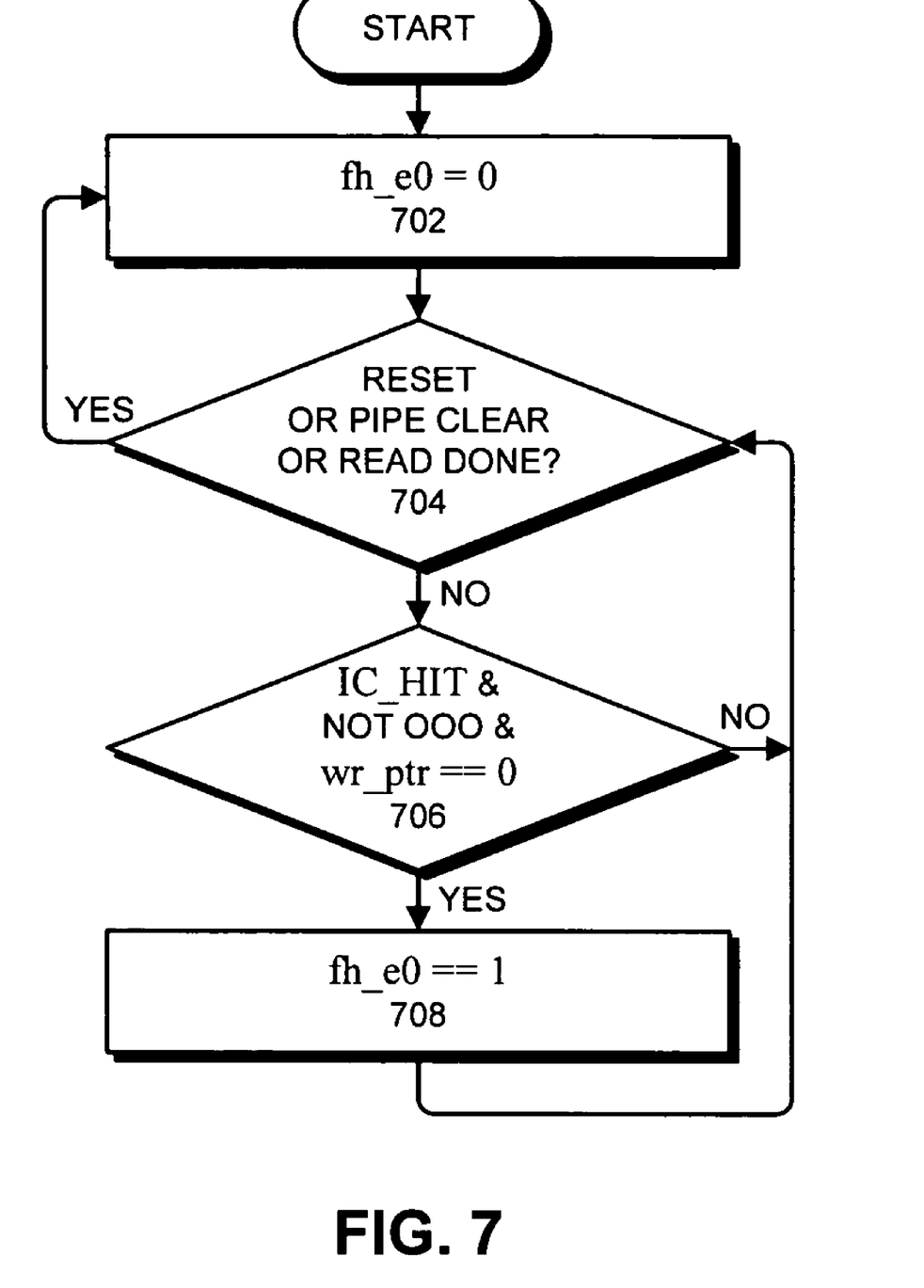
FIG. 7 presents a flow chart illustrating how a fetch-hit bit is updated in accordance with an embodiment of the present invention.

FIG. 7 presents a flow chart illustrating how a fetch-hit bit fh_e0 for entry e0 is updated in accordance with an embodiment of the present invention. (Note that the flow chart for the fetch hit bit fh_e1 for entry e1 is symmetric and is hence not described.)

First, the system sets fh_e0 to zero (step 702). Next, the system determines whether a reset, read-done or pipe-clear event has occurred (step 704).

If so, the system returns to step 702 to set fh_e0 to zero again. Otherwise, the system determines whether there was a cache hit & no out-of-order condition exists & wr_ptr==0 (step 706).

If so, the system sets fh_e0 to 1 (step 708) and returns to step 704. Otherwise, the system does not change fh_e0 and simply returns to step 704.

Miss-Queue Identifier

When a fetch x misses the instruction cache, it has to go through instruction miss queue 208 to L2 cache 210. During this process, the fetch assigned a miss queue slot allocation identifier (MQID). This MQID is stored in a corresponding entry (either e0 or e1) in IFB 104, which is determined by scanning the fetch miss bits and wr_ptr 316. This stored MQID is used when the miss returns from L2 cache 210. During a miss return, instruction miss queue 208 sends the corresponding MQID along with the returned cache line. This incoming MQID is compared against an MQID stored in IFB 104 to determine whether the corresponding cache line is being returned in-order.

Figure 8:
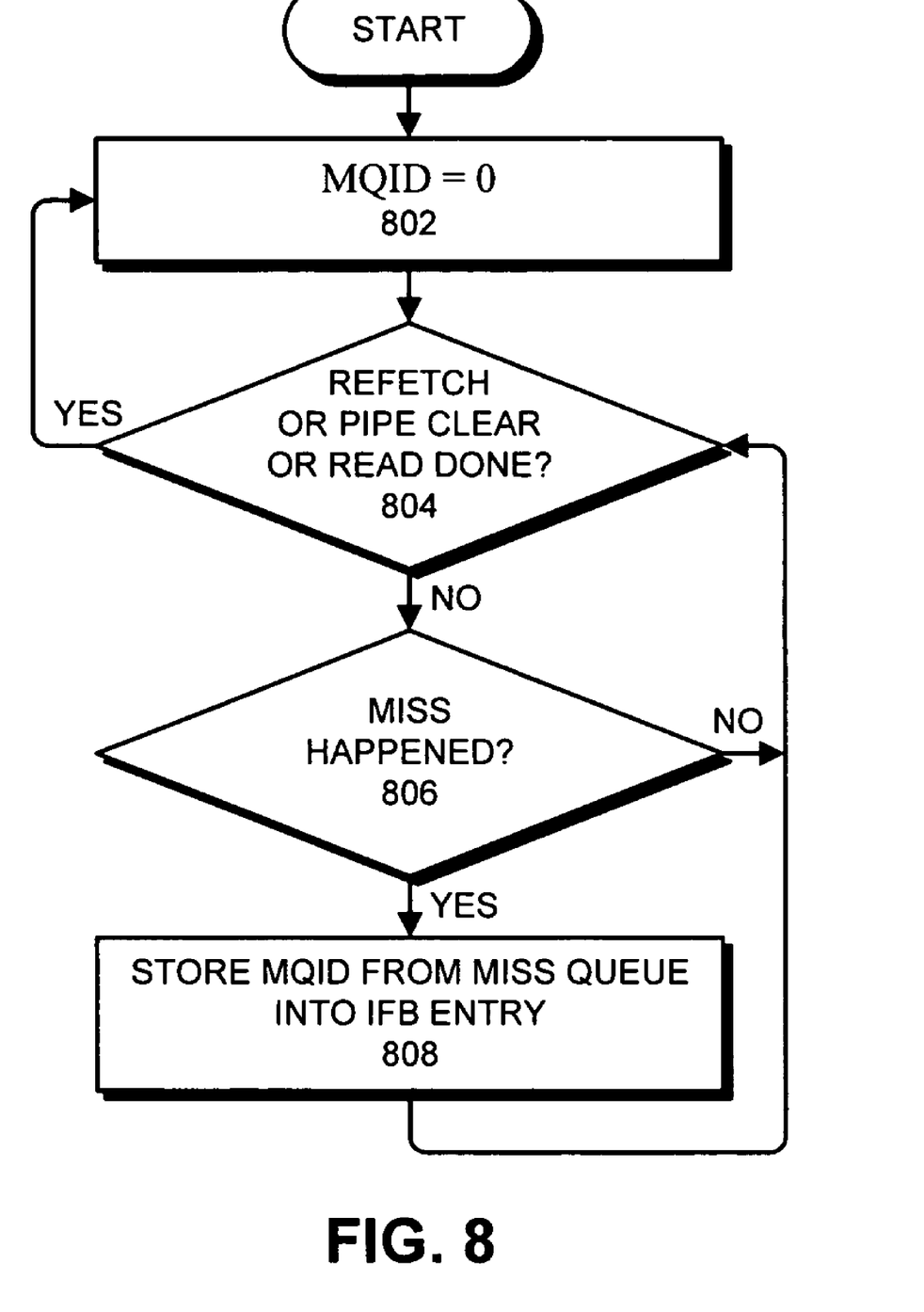
FIG. 8 presents a flow chart illustrating how a miss-queue identifier is stored in accordance with an embodiment of the present invention.

More specifically, FIG. 8 presents a flow chart illustrating how an MQID is stored into an entry in IFB 104 in accordance with an embodiment of the present invention. First, the system initializes MQID to zero (step 802). Next, the system determines whether a reset, read-done or pipe-clear event has occurred (step 804).

If so, the system returns to step 802 to initialize MQID to zero again. Otherwise, the system determines whether a cache miss happened (step 806).

If so, the system stores the MQID obtained from instruction miss queue 208 into a corresponding entry in IFB 104 (step 808) and returns to step 804. Storing the MQID into the corresponding entry in IFB 104 enables the system to determine whether a cache line is being returned out-of-order (for the case where both x and x+64 both caused cache misses).

Out-of-Order Return Detection for Miss-Miss Case

Figure 9:
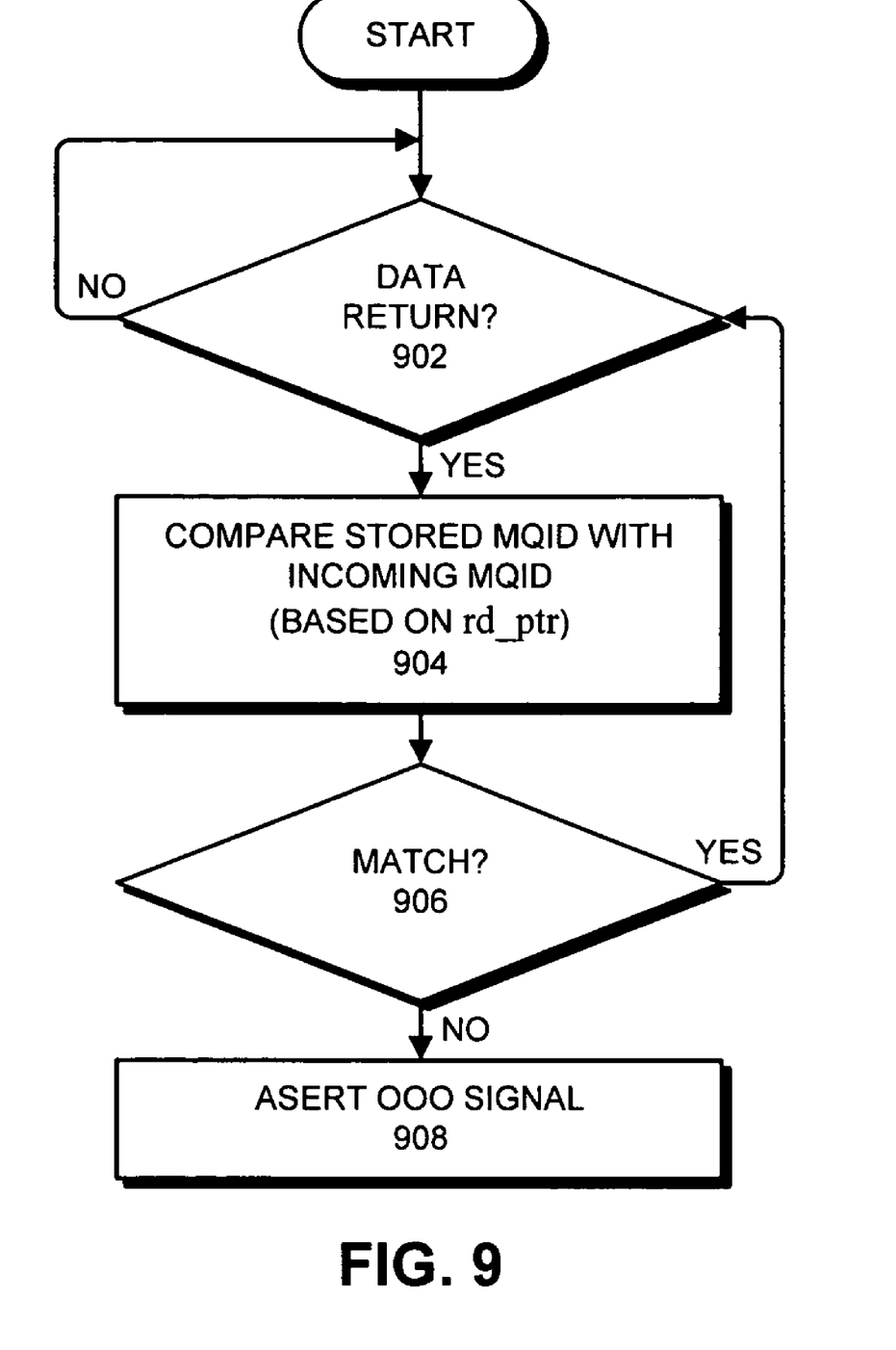
FIG. 9 presents a flow chart illustrating how an out-of-order return is detected in accordance with an embodiment of the present invention.

FIG. 9 presents a flow chart illustrating how an out-of-order return is detected in the case where both x and x+64 both caused cache misses in accordance with an embodiment of the present invention. First, the system determines whether a data return from an instruction-cache access has occurred (step 902). If not, the system loops back to step 902.

On the other hand, if a data return has occurred, the system compares an MQID stored in a corresponding entry of the IFB 104 with an incoming MQID which is sent by instruction miss queue 208 with the data return (step 904). If these match, the data return is in-order and the system returns to step 902. If they do not match, the system asserts OOO signal 212 to indicate that the data return is out-of-order (step 908).

Out-of-Order Return Detection for Miss-Hit Case

Figure 10:
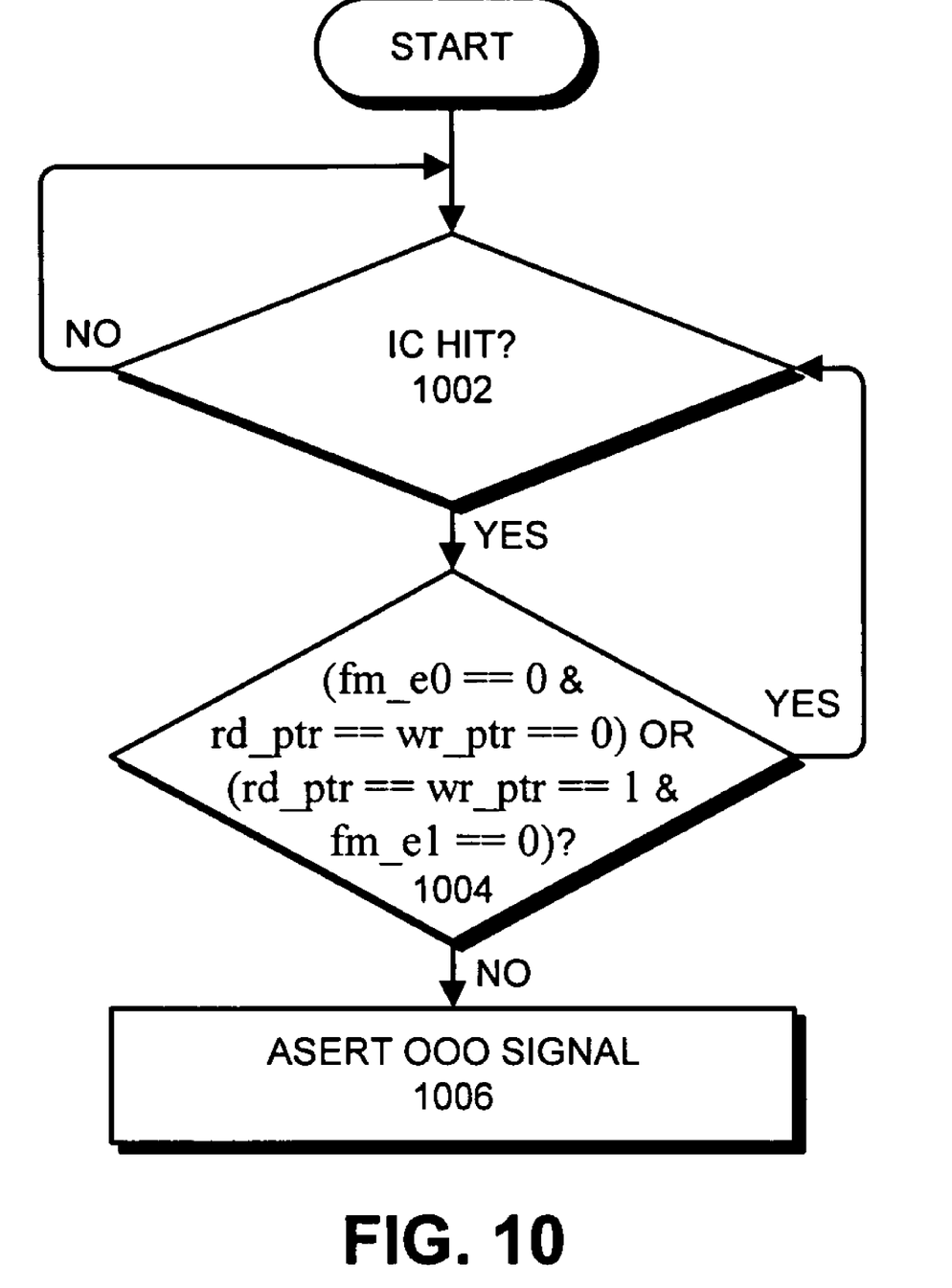
FIG. 10 illustrates how an out-of-order return is detected in accordance with an embodiment of the present invention.

FIG. 10 illustrates how an out-of-order return is detected for the case where x caused cache miss and x+64 caused a cache hit in accordance with an embodiment of the present invention. First, the system determines whether a cache hit has occurred (step 1002). If not, the system loops back to step 1002.

On the other hand, if a cache hit has occurred, the system determines whether the cache hit is for x+64 and the preceding cache line x caused a cache miss. More specifically, this involves determining whether (rd_ptr==wr_ptr==0 & fm_e0==0) OR (rd_ptr==wr_ptr==1 & fm_e1==0) (step 1004). If so, the cache hit is in-order and the system returns to step 1002. If not, the system asserts OOO signal 212 to indicate that the cache hit is out-of-order (step 1006).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for handling fetch requests that return out-of-order at an instruction fetch unit (IFU) of a processor, comprising:
sending a request to obtain a cache line to an instruction cache, wherein the request can be serviced and the cache line can be sent to a fetch buffer before a preceding cache line for a preceding request has returned from the instruction cache;
in response to the request, receiving the cache line from the instruction cache;
determining whether the cache line was returned out-of-order with respect to the preceding cache line; and
if so:
ignoring the cache line which was received out-of-order; and
restoring a fetch credit for a strand that sent the request, so that the strand can initiate another request.

2. The method of claim 1, wherein performing the action additionally involves undoing operations performed when the cache line was received out-of-order.

3. The method of claim 1, wherein performing the action additionally involves retrying the request for the cache line that was received out-of-order.

4. The method of claim 1, wherein the IFU includes a separate fetch buffer for each strand.

5. The method of claim 4, wherein a fetch buffer for a given strand contains a first entry and a second entry, whereby the first entry to can be written to while the second entry is read from, and vice versa.

6. The method of claim 5, wherein each fetch buffer entry is associated with:
a miss flag, which indicates whether a request for the entry has caused a cache miss; and
a hit flag, which indicates whether a request for the entry has caused a cache hit.

7. The method of claim 5, wherein each fetch buffer is associated with:
a write pointer, which points to an entry in the fetch buffer which is currently being written to; and
a read pointer, which points to an entry in the fetch buffer which is currently being read from.

8. The method of claim 5, wherein if the request to obtain the cache line causes an L1 cache miss, the method further comprises:
sending the request to an L2 cache;
storing a miss queue identifier (MQID) for the request into a fetch buffer entry; and
when a cache line is returned by the L2 cache, determining whether the cache line is being returned out-of-order by comparing an MQID returned along with the cache line against an MQID stored in the fetch buffer entry.

9. An apparatus that handles instruction-cache requests that return out-of-order, comprising:
an instruction fetch unit (IFU) within a processor;
a sending mechanism within the IFU configured to send a request to obtain a cache line to an instruction cache, wherein the request can be serviced and the cache line can be sent to a fetch buffer before a preceding cache line for a preceding request has returned from the instruction cache;
a receiving mechanism within the IFU configured to received the cache line from the instruction cache in response to the request; and
a out-of-order processing mechanism within the IFU configured to,
determine whether the cache line was returned out-of-order with respect to the preceding cache line; and
if so:
ignore the cache line which was received out-of-order; and
restore a fetch credit for a strand that sent the request, so that the strand can initiate another request.

10. The apparatus of claim 9, wherein while performing the action, the out-of-order processing mechanism is additionally configured to undo operations performed when the cache line was received out-of-order.

11. The apparatus of claim 9, wherein while performing the action, the out-of-order processing mechanism is additionally configured to retry the request for the cache line that was received out-of-order.

12. The apparatus of claim 9, wherein the IFU includes a separate fetch buffer for each strand.

13. The apparatus of claim 12, wherein a fetch buffer for a given strand contains a first entry and a second entry, whereby the first entry to can be written to while the second entry is read from, and vice versa.

14. The apparatus of claim 13, wherein each fetch buffer entry is associated with:
a miss flag, which indicates whether a request for the entry has caused a cache miss; and
a hit flag, which indicates whether a request for the entry has caused a cache hit.

15. The apparatus of claim 13, wherein each fetch buffer is associated with:
a write pointer, which points to an entry in the fetch buffer which is currently being written to; and
a read pointer, which points to an entry in the fetch buffer which is currently being read from.

16. The apparatus of claim 13, wherein if the request to obtain the cache line causes an L1 cache miss, the IFU is configured to:
send the request to an L2 cache;
store a miss queue identifier (MQID) for the request into a fetch buffer entry; and
when a cache line is returned by the L2 cache, to determine whether the cache line is being returned out-of-order by comparing an MQID returned along with the cache line against an MQID stored in the fetch buffer entry.

17. A computer system that handles instruction-cache requests that return out-of-order, comprising:
- a processor;
- a memory;
- an instruction fetch unit (IFU) within the processor;
- a sending mechanism within the IFU configured to send a request to obtain a cache line to an instruction cache, wherein the request can be serviced and the cache line can be sent to a fetch buffer before a preceding cache line for a preceding request has returned from the instruction cache;
- a receiving mechanism within the IFU configured to received the cache line from the instruction cache in response to the request; and
- a out-of-order processing mechanism within the IFU configured to,
    - determine whether the cache line was returned out-of-order with respect to the preceding cache line; and
    - if so:
        - ignore the cache line which was received out-of-order; and
        - restore a fetch credit for a strand that sent the request, so that the strand can initiate another request.

18. The computer system of claim 17, wherein while performing the action, the out-of-order processing mechanism is additionally configured to undo operations performed when the cache line was received out-of-order.

19. The computer system of claim 17, wherein while performing the action, the out-of-order processing mechanism is additionally configured to retry the request for the cache line that was received out-of-order.

20. The computer system of claim 17, wherein the IFU includes a separate fetch buffer for each strand.

21. The computer system of claim 20, wherein a fetch buffer for a given strand contains a first entry and a second entry, whereby the first entry to can be written to while the second entry is read from, and vice versa.

* * * * *

UNITED STATES PATENT AND TRADEMARK OFFICE
CERTIFICATE OF CORRECTION

PATENT NO. : 7,664,918 B2
APPLICATION NO. : 11/492257
DATED : February 16, 2010
INVENTOR(S) : Ali et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Seventh Day of December, 2010

David J. Kappos
*Director of the United States Patent and Trademark Office*